Figure 1:
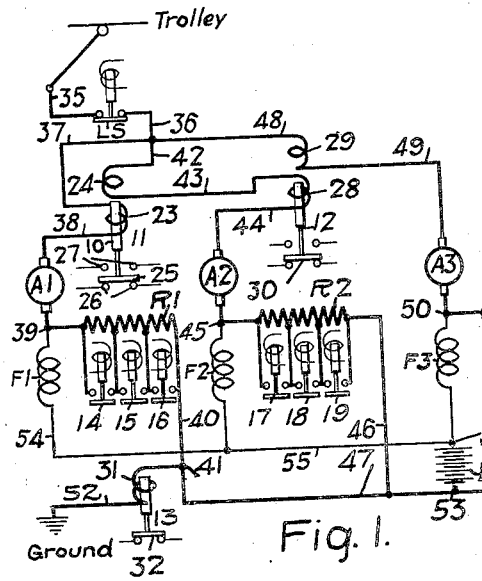

R. E. HELLMUND.
SYSTEM OF CONTROL.
APPLICATION FILED SEPT. 27, 1916.

1,336,562.

Patented Apr. 13, 1920.
2 SHEETS—SHEET 1.

WITNESSES:
R.J.Ridge
W.R.Coley

INVENTOR
Rudolf E. Hellmund.
BY
Wesley G. Carr
ATTORNEY

R. E. HELLMUND.
SYSTEM OF CONTROL.
APPLICATION FILED SEPT. 27, 1916.
1,336,562.
Patented Apr. 13, 1920.
2 SHEETS—SHEET 2.
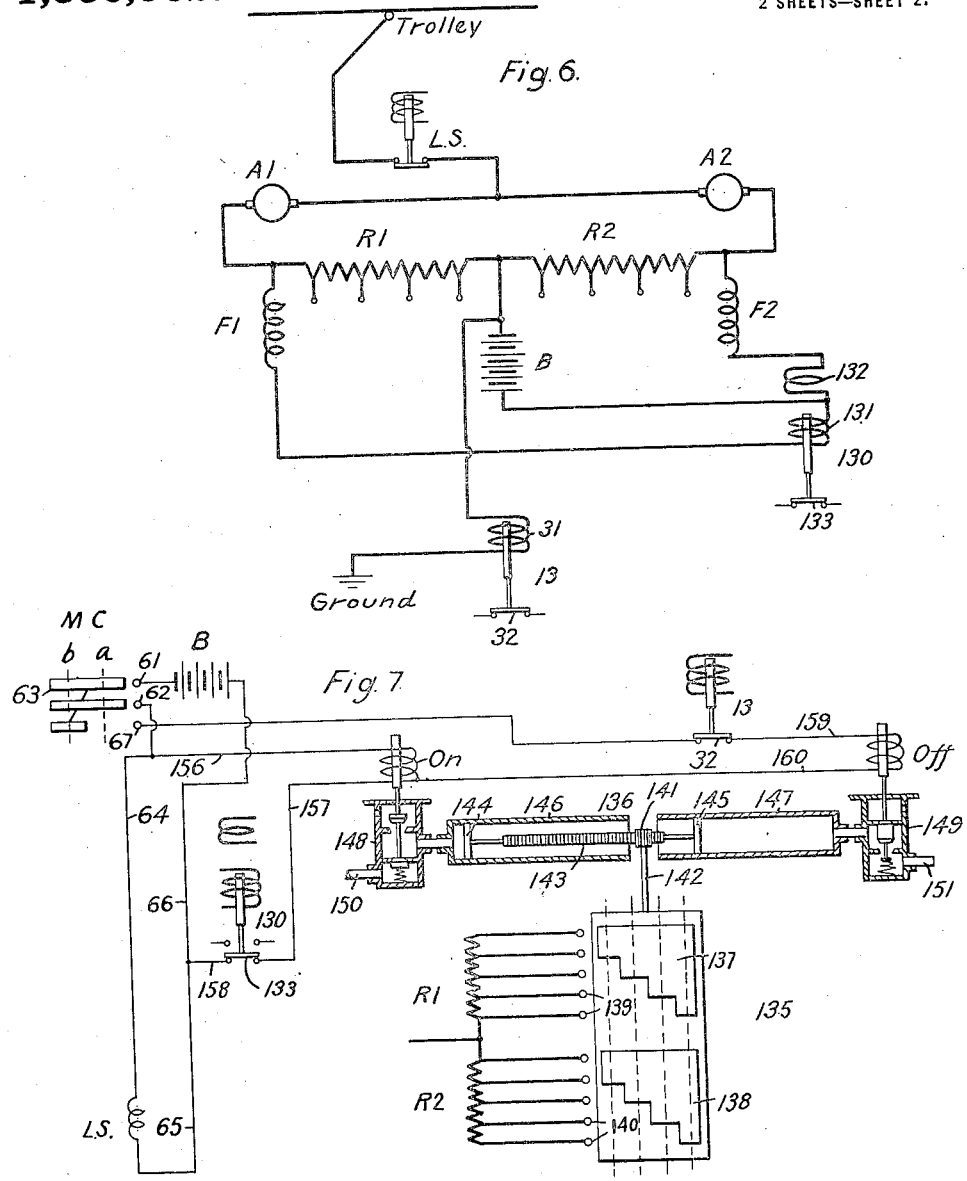
WITNESSES:
Fred H Miller
W. R. Coley
INVENTOR
Rudolf E. Hellmund
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,336,562.   Specification of Letters Patent.   Patented Apr. 13, 1920.

Application filed September 27, 1916. Serial No. 122,373.

*To all whom it may concern:*

Be it known that I, RUDOLF E. HELLMUND, a subject of the German Emperor, and a resident of Swissvale, in the county of Allegheny and State of Pennsylvania, have invented a new and useful Improvement in Systems of Control, of which the following is a specification.

My invention relates to electric vehicles and to systems of control therefor and especially to vehicles embodying dynamo-electric machines that are adapted for regenerative operation.

Whenever an electric vehicle is retarded by means of the electro-dynamic or regenerative operation of the machines, there is a certain liability that difficulty will be experienced by reason of skidding of one or more of the sets of wheels, and, meanwhile, a relatively low current and torque are produced by the machines associated with skidding wheels.

Assuming, for instance, that a plurality of momentum-driven machines are regenerating in parallel relation and that the control thereof is automatic, that is, dependent upon the well-known action of a limit switch, it may happen that the wheels corresponding to one machine will skid, and the control system will be automatically actuated to close further switches, or the like, by reason of the relatively low-current conditions prevailing in the skidding-machine circuit, thus overloading the other machines which, in turn, may cause the wheels associated with them to skid and, moreover, is, of course, undesirable from the standpoint of heating. Similar objectionable conditions may occur with manually-operated control systems if one of the machines skids and the operator, noticing that the braking effect has been reduced, actuates his controller to a subsequent position, as will be understood.

One object of my invention, therefore, is to provide, in connection with a system of the above-indicated character, means which shall be relatively simple and inexpensive in construction and effective and reliable in operation for automatically performing predetermined functions to halt or reverse the normal operation of the system under wheel-skidding conditions, until a normal state of affairs again obtains.

Another object of my invention is to provide means of a relatively simple and reliable character for automatically sanding the rails whenever the wheels associated with any vehicle machine skids.

According to my present invention, I provide, preferably, an automatic auxiliary governing system for a plurality of momentum-driven dynamo-electric machines, which system is controlled, in the familiar manner, by a limit switch and relay means that are electrically related to the respective armatures in such manner that, when the loads of all the machines are equal, the relay means are inoperative with respect to modifying the auxiliary control system operation, but, whenever skidding conditions occur in any machine, so that the current therethrough is materially reduced by reason of the relatively great change of speed of the skidding-machine armature, then the relay means in question acts to halt or reverse the normal automatic operation of the control system, or, in other words, renders the limit switch temporarily inoperative until normal speed conditions of all the machines again obtains.

Figure 3:
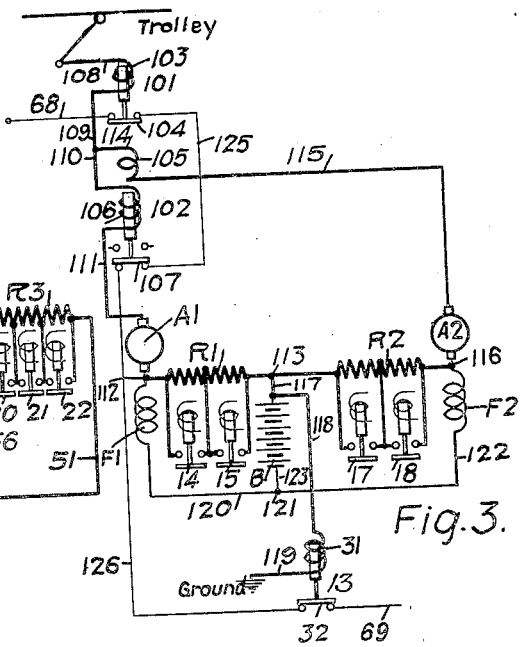
Figure 4:
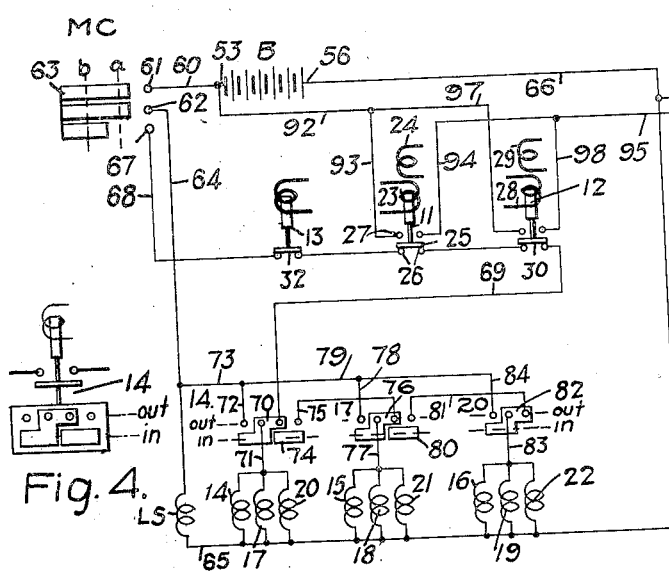
Figure 2:
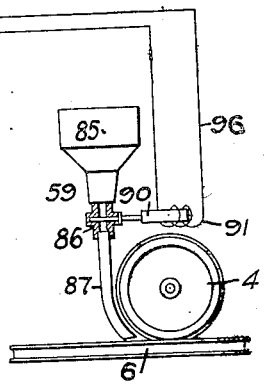
Figure 5:

In the accompanying drawing, Figure 1 is a diagrammatic view of the main circuits of a system of control embodying my invention; Fig. 2 is a diagrammatic view of an auxiliary governing system for the main system of Fig. 1 and of an accessory rail-sanding device; Fig. 3 is a diagrammatic view of a portion of a modified control system arranged in accordance with my invention; Fig. 4 is a detailed diagrammatic view of a complete main-circuit switching device; Fig. 5 is a diagrammatic view of an electric vehicle that is adapted to utilize the principles of my present invention; and Fig. 6 and Fig. 7 are views that respectively correspond to Fig. 1 and Fig. 2, of another modification of my invention.

Referring first to Fig. 5, the structure shown comprises a locomotive cab 1 which is suitably supported upon a plurality of articulated trucks 2 and 3 of appropriate design and which respectively embody a plurality of driving wheels 4 and 5 that are adapted to run upon rails 6 in accordance with usual practice. A plurality of dynamo-electric machines M1 and M2, which are adapted to regeneratively brake the vehicle, as well as electrically propel it, are provided and may be associated with the wheels of the various trucks in any suitable manner, as by driving mechanisms 7 and 8 of a familiar type.

Referring now to Fig. 1, the system shown comprises a plurality of suitable supply-circuit conductors respectively marked "Trolley" and "Ground," a plurality of parallel-related dynamo-electric machines respectively having armatures A1, A2 and A3, and field-magnet windings F1, F2 and F3 of the series type; a plurality of variable resistors R1, R2 and R3, which are connected in series-circuit relation with the respective armatures for a purpose to be described; an auxiliary source of energy, here represented by a battery B, for exciting the field winding; a line switch LS and a limit switch 13 of familiar types; a pair of relay devices 11 and 12 that are adapted to be differentially energized in accordance with the currents traversing various pairs of machine armatures; and a plurality of switches 14 to 22, inclusive, that are associated in groups of three with the respective main-circuit resistors R1, R2 and R3.

The relay device 11 comprises a suitable magnetizable core member or plunger 10 which is adapted to be differentially energized by a pair of actuating coils 23 and 24, the circuits of which will be hereinafter traced. A movable contact member 25 is associated with the core member 10 in any suitable manner and is adapted to bridge a pair of stationary contact members 26, when occupying its lower or normal position, and to bridge a second pair of stationary contact members 27, when in its upper position, wherein the coils 23 and 24 are not equally energized.

The similar relay device 12 is provided with differentially-arranged actuating coils 28 and 29 and a movable contact member 30, and corresponds, in all respects, to the relay device 11.

The limit switch 13 has the usual main-circuit actuating coil 31 and auxiliary-circuit movable contact members 32, for a purpose to be described in connection with Fig. 2.

Assuming that regenerative operation has been begun in any suitable manner and that the line switch LS has been closed, as subsequently described in detail, the main circuits of the regenerative system may be traced as follows: a common circuit is established from the Trolley, through conductor 35, the closed switch LS, conductor 36, where the circuit divides, one branch including conductor 37, actuating coil 23 of the relay device 11, conductor 38, main armature A1, junction-point 39, main-circuit resistor R1 and conductor 40 to a second junction-point 41, a second branch including conductor 42, actuating coil 24 of the relay device 11, conductor 43, actuating coil 28 of the other relay device 12, conductor 44, main armature A2, junction-point 45, main-circuit resistor R2, and conductors 46 and 47 to the junction-point 41, and a third branch including conductor 48, actuating coil 29 of the relay device 12, conductor 49, armature A3, junction-point 50, main-circuit resistor R3 and conductors 51 and 47 to the junction-point 41, whence circuit is completed through the actuating coil 31 of the limit switch 13 and conductor 52 to the negative conductor Ground.

The field-winding excitation circuit is established from the positive terminal 53 of the battery B, through conductors 47 and 40 and the main-circuit resistor R1, whence circuit is continued through the field winding F1 and conductors 54 and 55 to the negative battery terminal 56. The other field windings F2 and F3 are similarly energized from the common source of energy B through the respective resistors R2 and R3.

It will be understood that my present invention is in no way limited to the use of a battery for exciting the main field windings since any other suitable source of energy, such as the generator end of a motor-generator set or dynamotor, may be successfully utilized, if desired.

Inasmuch as the particular system of main-circuit connections, other than the proper relation of the relay devices 11 and 12 thereto, is immaterial to my present invention, no further description thereof is believed to be necessary. It will be understood that sufficient variations of armature currents occur, under skidding conditions, to suitably actuate the relay devices.

The system just set forth is fully described in my co-pending application, Serial No. 44,443, filed August 9, 1915, patented April 1, 1919, No. 1,298,706, to which reference may be made if it is desired to understand the regenerative operation of the machines in detail. In the present instance, it is of interest to note only that the variation of the main-circuit resistors R1, R2 and R3 by the manipulation of the corresponding switches 14 to 22, inclusive, serves to increase the field-winding excitation of the momentum-driven machines as the speed thereof decreases, thus automatically and suitably regulating the regenerative operation, since the action of the resistor short-circuiting switches is dependent upon the limit switch 13, as about to be described in detail.

Referring now to Fig. 2, the auxiliary governing system shown comprises the actuating coils of the various switches and the auxiliary contact members of the various relay devices that are shown in Fig. 1 and, in addition, a master controller MC that is adapted to occupy a plurality of operative positions *a* and *b;* a plurality of interlocking contact members of a well-known type that are associated with certain switches in accordance with the familiar construction that is illustrated in Fig. 4 in connection with the switch 14; a suitable source of energy, such as the battery B, for exciting the various actuating coils of the switches; and an accessory rail-sanding device 59.

Assuming that conditions are proper for regenerative operation, the master controller may be actuated to its initial operative position a, whereupon one circuit is completed from the positive terminal 53 of the battery B through conductor 60, control fingers 61 and 62, which are bridged by contact segment 63 of the master controller, conductor 64, the actuating coil of the line switch LS and conductors 65 and 66 to the negative battery terminals 56. The regenerative circuits are thus connected to the supply circuit, as previously traced out.

It will be understood that, for the sake of simplicity and clearness, various switches which would actually be used in a commercial regenerative system for interconnecting the main machines, etc., are not shown in the present instance, as such illustration is not necessary to a thorough comprehension of my invention.

To effect further regenerative operation, the master controller may be moved to its position b, whereby a circuit is completed from the contact segment 63 of the master controller through control fingers 67, conductor 68, the auxiliary contact members 32 of the limit switch 13 in its lower position, auxiliary movable contact members 25 and 30 of the relay devices 11 and 12, respectively, together with the corresponding stationary contact members, conductor 69, interlock 70—14—out, conductor 71, the parallel-related actuating coils of the switches 14, 17 and 20 to the negatively-connected conductors 65. Thus, corresponding sections of the main-circuit resistors R1, R2 and R3 are simultaneously excluded from circuit as soon as the limit switch 13 drops to its lower position, after the initial closure of the line switch LS.

As soon as the switches 14, 17 and 20 are closed, a holding circuit of a familiar type for the actuating coils thereof is formed, including conductor 71, interlock 70—14—in and conductors 72 and 73 which are connected to the positively energized conductor 64. Thus, the switches 14, 17 and 20 will remain closed during the remainder of the machine operation, irrespective of the action of the limit switch 13.

When the limit switch has again dropped to its lower or operative position, a further circuit is completed through the "progression circuit" comprising the auxiliary contact members of the limit switch and of the relay devices 11 and 12, as hereinbefore described, to conductor 69, whence a new circuit is continued through interlock 74—14—in, conductor 75, interlock 76—17—out, conductor 77 and the parallel-related actuating coils of the switches 15, 18 and 21 to the negative conductor 65. Thus, further corresponding sections of the main-circuit resistors R1, R2 and R3 are short-circuited to compensate for the concurrent decrease in machine speed, whereby a substantially constant regenerated current is automatically maintained.

Upon the closure of the switches 15, 18 and 21, a holding circuit for the actuating coils thereof is formed, comprising conductor 77, interlock 76—17—in and conductors 78 and 79 to the positively energized conductor 73.

When the limit switch 13 has again dropped to its lower position, a circuit is completed through the auxiliary contact members of the various relay devices to the conductor 75, as hereinbefore set forth, whence a new circuit is completed through interlock 80—17—in, conductor 81, interlock 82—20—out, conductor 83 and the actuating coils of the switches 16, 19 and 22 to the negative conductor 65. Thus, the final illustrated sections of the main-circuit resistors are short-circuited, for the purpose set forth. As soon as the switches 16, 19 and 22 have closed, a holding circuit for the actuating coils thereof is formed, comprising conductor 83, interlock 82—20—in and conductor 84, which is connected to the positively energized conductor 79.

It will be understood that the number and resistance value of the short-circuited sections of the resistors R1, R2 and R3 may be chosen to suit the particular operating conditions and I have not deemed it necessary to illustrate more than three of such sections, since the limit switch 13 automatically controls the operation of the resistor short-circuiting switches, of whatever number, in the well-known manner that has been described, during the normal operation of the system.

The operation of my system under the above-mentioned emergency conditions of any motor may be set forth as follows: When the previously described normal operation obtains, the currents traversing the two actuating coils of each relay device 11 and 12 are substantially equal and, since the allied pairs of coils are differentially arranged, it follows that no movement of the relay device occurs. However, if the wheel associated with either of the armatures A1 and A2, for example, should skid during the regenerative period, the current traversing the corresponding actuating coil of the relay device 11 would be accordingly decreased, with the result that the effective energization of the relay device 11 would be such as to raise the device to its upper position, wherein the movable contact member 25 would bridge the stationary contact members 27.

In the first place, the previously described "progression circuit", including the conductor 69, is interrupted by the separation of the contact members 25 and 26 of the relay device 11, thus rendering the limit switch 13 inoperative to further continue the normal operation of the system, or, in other words, whatever switches have been previously closed, remain closed and the normal operation of the system is halted at the particular point where the relay device 11 was raised to its upper position.

In a similar manner, if a material difference of speed occurs between the armatures A2 and A3 by reason of the skidding of the wheels associated with either machine, the weakened action of one of the coils 28 and 29 upon the relay device 12 causes the device to be lifted to its upper position to interrupt the above mentioned "progression circuit", and again the normal operation of the system is halted until the usual operating conditions obtain.

The accessory rail-sanding device 59 may be of any suitable type and is shown as comprising a hopper or sand-containing vessel 85, the lower end of which is provided with a suitable valve member 86 that communicates with a tube or spout 87 for suitably supplying sand to the rails 6 in front of the wheels 4, as illustrated in the figure. It will be understood that such a rail-sanding device may be provided in connection with any suitable number of vehicle wheels.

The valve members 86 may be actuated by a core member 90, which is adapted to be energized by a coil 91, under the above-mentioned skidding conditions.

For example, when the relay device 11 occupies its upper position, wherein the auxiliary movable contact member 25 bridges the stationary contact members 27, a circuit is completed from the positive terminal 53 of the battery B through conductors 92 and 93, the coöperating stationary and movable contact members 27 and 25, respectively, of the relay device 11, conductors 94 and 95, the actuating coil 91 of the rail-sanding apparatus and conductors 96 and 66 to the negative terminal 56 of the battery B.

Similarly, if the other relay device 12 is actuated to its upper position by reason of predetermined skidding conditions, a circuit is completed from the positively energized conductor 92 through conductor 97, the auxiliary movable contact member 30 of the relay device 12 in its upper position and conductor 98 to conductor 95, whence circuit is completed, as just traced, to actuate the rail-sanding device.

Thus, the operation of either of the relay devices 11 and 12, under the above-mentioned conditions of any machine, causes the operation of the control system to be temporarily halted and also is utilized to automatically sand the rails, whereby the previously-mentioned undesirable operating conditions of the prior art are reliably and effectively obviated.

Reference may now be had to Fig. 3, wherein the system shown comprises the supply-circuit conductors Trolley and Ground, a plurality of parallel-related dynamo-electric machines respectively having the armatures A1 and A2 and the field windings F1 and F2; the main-circuit resistors R1 and R2; the limit switch 13; the switches 14 and 15 that are associated with the resistor R1, and 17 and 18 which are adapted to govern the resistor R2; the battery B; and a plurality of relay devices 101 and 102, for purposes to be described.

The relay device 101 is provided with an actuating coil 103 that receives the combined machine currents and an auxiliary movable contact member 104 that is connected in the "progression circuit," as described in Fig. 2 and as indicated by the adjacent conductor 68.

The other relay device 102 is similar in construction and operation to the previously-described relay devices 11 and 12 and is provided with a pair of differentially-arranged actuating coils 105 and 106 that are respectively connected in series relation with the armatures A1 and A2. The relay device is provided with a movable contact member 107 that corresponds to the contact members 25 and 30 of the relay devices 11 and 12, respectively.

Assuming that regenerative operation has been begun in any suitable manner, the main-circuit connections may be traced as follows: from the trolley through conductor 108, the actuating coil 103 of the relay device 101 and conductor 109, where the circuit divides, one branch including conductor 110, the actuating coil 106 of the relay device 102, conductor 111, main armature A1, junction-point 112 and main-circuit resistor R1 to a second junction-point 113, and the other branch including conductor 114, the actuating coil 105 of the relay device 102, conductor 115, junction-point 116 and main-circuit resistor R2 to the junction-point 113, whence a common circuit is completed through conductors 117 and 118, the actuating coil 31 of the limit switch 13 and conductor 119 to the negative conductor Ground.

The field-winding excitation circuit is completed from one terminal of the battery B, or other source of energy, through conductor 117, junction-point 113, main-circuit resistor R1, junction-point 112, main field winding F1 and conductor 120 to junction-point 121, and another branch includes main-circuit resistor R2, junction-point 116, main field winding F2 and conductor 122 to the junction-point 121, whence a common circuit is completed through conductor 123 to the opposite terminal of the battery B.

The main circuits thus correspond very closely to the previously-described main circuits that are shown in Fig. 1.

I have not deemed it necessary to illustrate a complete auxiliary control system for governing the main circuits of Fig. 3, but have shown, in connection therewith, as about to be traced, the previously-mentioned "progression circuit" which is similar in its office to that set forth in connection with Fig. 2, and those skilled in the art will readily be able to substitute the auxiliary "progression circuit" of Fig. 3 for the initially described "progression circuit" and make such other minor changes as are necessary; for example, the variation of the number of short-circuiting switches by reason of the fact that only two machines are illustrated in Fig. 3.

The new "progression circuit" is completed from a conductor that corresponds to conductor 68, auxiliary contact member 104 of the relay device 101, in its upper or closed position, conductor 125, auxiliary contact member 107 of the relay device 102, in its lower or closed position, conductor 126 and auxiliary contact member 32 of the limit switch 13, in its lower or operative position, to a conductor that corresponds to conductor 69.

Thus, the functions of the limit switch 13 and of the relay device 102 are similar to those previously set forth in connection with the system that is shown in Fig. 2 (moreover, the rail-sanding device 59 may be associated with the relay device 102, if desired). The relay device 101, which receives current from both regenerating machines, is adapted to drop to its lower position to open the "progression circuit" whenever skidding conditions in both armatures A1 and A2 obtain whereby a relatively low combined current traverses the main circuit. Thus, the normal operation of the system is arrested whenever either or both of the regenerating machines skids.

In some systems that inherently tend to maintain a substantially constant regenerated current, it may be preferable to employ relays that are energized in accordance with the respective field-winding currents or voltages rather than by the armature currents, as previously described, the reason being that the main field-winding current and voltage are generally increased as the speeds of the momentum-driven machines decrease and thus the field-winding voltage or current alone is a substantially correct indication or measure of the machine speed. By utilizing the relay devices that are energized in accordance with field-winding conditions, in some cases more reliable operation of the devices will be obtained and, moreover, they need not be designed to act as sensitively as the hereinbefore-described relay devices.

Fig. 6 and Fig. 7 set forth a system that embodies the characteristics just mentioned, that is, the relay devices for automatically modifying the normal machine operation, under skidding conditions in any machine, are energized in accordance with the currents traversing the respective machine field windings. In my co-pending application, Serial No. 154,864, filed March 14, 1917, is shown and described a regenerative control system wherein a substantially constant speed of the regenerating machines is maintained by controlling the system connections in accordance with the main field-winding current or voltage variations, and the system about to be described constitutes a special case wherein the principle just recited is utilized for a different purpose.

Referring to Fig. 6, the system shown comprises the supply-circuit conductors, main dynamo-electric machines, variable main-circuit resistors, auxiliary exciting source and limit switch as described in connection with Fig. 3, and, in addition, a relay device 130 for modifying the normal machine operation upon the occurrence of a material difference in the machine speeds.

The relay device 130 is provided with a pair of differentially-arranged actuating coils 131 and 132 that are respectively connected in series relation with the main field windings F1 and F2, and suitable auxiliary contact members 133 of the relay device are provided for governing certain auxiliary-circuit connections, as subsequently described in connection with Fig. 7.

Inasmuch as the connection of the relay-device actuating coils constitutes the only difference from the main circuits of Fig. 3, other than the omission of the relay device 102 and the substitution of the line switch LS for relay device 101, it is not believed that any further description of the main circuits that are illustrated in Fig. 6 is necessary.

As previously stated, the actuating coils for the relay device 130 may be energized in accordance with the main field-winging voltages, if desired; that is, the actuating coils may be connected directly across the main field windings F1 and F2, respectively.

With reference to Fig. 7, the auxiliary governing system shown comprises the master controller MC, the battery B, the actuating coil of the line switch LS and the auxiliary contact members of the limit switch 13, as previously described in connection with Fig. 2, and, in addition, the auxiliary contact members 133 of the relay device 130, a drum controller 135 for varying the active circuit values of the resistors R1 and R2, and an actuating mechanism 136 for the controller 135.

The controller 135 is provided with a plurality of contact segments 137 and 138 of configurations suitable for successively engaging a plurality of sets of control fingers 139 and 140, respectively, and thus gradually short-circuiting the main-circuit resistors R1 and R2, in accordance with a familiar practice.

The actuating mechanism 136 is of a familiar electrically-controller, pneumatically-actuated type and comprises a pinion 141 which is suitably secured to the upper end of the controller operating shaft 142 and is adapted to mesh with a horizontally-movable rack member 143, to the opposite ends of which a plurality of pistons 144 and 145 are respectively attached to travel within suitable operating cylinders 146 and 147. A pair of dissimilar valve members 148 and 149 are associated with the respective cylinders 146 and 147 to admit fluid pressure thereto through pipes or passages 150 and 151 from any suitable source (not shown), under conditions to be described.

The valve member 148 is normally closed to prevent the access of fluid pressure to the cylinder 146 and is adapted to admit fluid pressure thereto only when an actuating coil marked "On" is energized. On the other hand, the valve member 149 is normally open to admit fluid pressure to the cylinder 147, and only when its actuating coil marked "Off" is energized, is fluid pressure released from the cylinder to the atmosphere, while communication with the inlet pipe 151 is shut off.

The mechanical operation of the actuating mechanism 136, without regard to the electrical connections effected thereby, may be set forth as follows: By reason of the normal open condition of the valve member 149, it follows that the pistons 144 and 145 and the mechanically connected drum controller 135 are normally biased to the illustrated positions, wherein the entire main-circuit resistors R1 and R2 are actively included in the main circuits. Upon the simultaneous energization of the actuating coils "On" and "Off," the normal unbalanced fluid-pressure conditions in the actuating mechanism 136 are reversed, that is, fluid pressure is admitted to the cylinder 146 and is exhausted from the cylinder 147, whereby the pistons move toward the right from the illustrated position, while the drum controller moves toward the left to cause coöperative engagement of the corresponding contact segments and control fingers and thus gradually short-circuit the resistors R1 and R2.

The movement of the actuating mechanism may be arrested at any point by merely deënergizing the "off" actuating coil, and such action is accomplished in the illustrated system by means of the familiar limit switch 13 whenever the main-circuit current rises above a predetermined value, as subsequently described in detail.

To effect the return movement of the actuating mechanism, both the "off" and the "on" coil are deënergized, and the consequent reversion of fluid-pressure conditions to the initial unbalanced state causes backward movement toward the illustrated position.

Assuming that conditions are proper for regenerative operation, the master controller MC is actuated to its initial operative position $a$, whereupon one circuit is established from the positive terminal of the battery B through conductors 60, control fingers 61 and 62, which are bridged by the contact segment 63, conductor 64, the actuating coil of the line switch LS and conductors 65 and 66 to the negative battery terminal.

A further circuit is established from the positively-energized control finger 62 through connector 156, the actuating coil "On" of the operating mechanism 136, conductor 157, auxiliary contact members 133 of the relay device 130 in its lower position, and conductor 158 to the negative conductor 66.

The momentum-driven machines are thus connected to the supply circuit, with the entire resistors R1 and R2 included in the respective main-armature circuits.

No movement of the controller 135 occurs, however, until the master controller is moved to its second operative position $b$ to complete a circuit from the contact segment 63 thereof through control finger 67, conductor 68, coöperating contact members 32 of the limit switch 13, conductor 159, the actuating coil "off," conductor 160 and thence, through conductor 157, to the negative battery terminal, as already traced.

Since both actuating coils of the operating mechanism 136 are simultaneously energized, movement thereof through its successive positions in a step-by-step manner occurs, such movement being controlled by the action of the limit switch 13, which holds the controller 135 in the corresponding position whenever the main-circuit current rises above a certain value, in accordance with familiar principles.

However, upon the occurrence of the previously-mentioned skidding conditions in either machine, the resultant strengthening of the corresponding main field-winding excitation, by reason of the inherent regulating action hereinbefore set forth and the consequent energization of the relay device 130 by the materially different main field-winding currents, will cause the relay device to rise to its upper position and thus interrupt the previously traced energizing circuits of both the "on" and the "off" actuating coils for the controller 135. Thus, the controller gradually returns toward its "off" position to insert more resistance in the main circuits, and thereby tend to restore normal operating conditions, until the relay device 130 drops to its illustrated position to again energize the actuating coils in question and thus permit forward movement of the controller 135, as governed by the limit switch 13.

It will be understood that, if desired, instead of utilizing a common controller 135 for both main-circuit resistors R1 and R2, separate controllers may be used, and, upon skidding conditions in either machine, only the corresponding main-circuit controller may be halted or moved backwardly. Such results could be accomplished, for example, by employing low-current relay devices in the armature circuits of the respective machines, the auxiliary control system being arranged somewhat similarly to that set forth in Fig. 7 in that, upon a decrease of current in either main machine by reason of skidding conditions, the drop of the corresponding relay device to a lower position would, for instance, deënergize both the "on" and the "off" actuating coils of the allied controller.

Another means of accomplishing the result just mentioned comprises differentially-related relay devices of the motor type that are energized in accordance with the circuit conditions of the respective machines, as set forth in my co-pending application, Serial No. 70,437, filed January 15, 1916.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with a plurality of dynamo-electric machines, of means comprising a plurality of switches for normally and progressively effecting operation of said machines, and means dependent upon a material difference in the machine speeds for automatically halting said operation while maintaining the position of said switches unchanged.

2. In a system of control, the combination with a plurality of dynamo-electric machines, of means comprising a plurality of switches for normally and automatically operating said machines in accordance with current conditions, and means dependent upon a material difference in the machine speeds for automatically halting said operation until normal speed conditions again obtain while maintaining the position of said switches unchanged.

3. In a system of control, the combination with a plurality of dynamo-electric machines, of means comprising a plurality of switches for normally and progressively effecting operation of said machines, and differential relay means adapted to automatically halt said operation while maintaining the position of said switches unchanged and having opposing coils that are energized in accordance with the respective machine currents.

4. In a system of control, the combination with a plurality of dynamo-electric machines, of a plurality of switches for closing in a predetermined sequence to effect operation of said machines, and means dependent upon a material difference of machine speeds for preventing any change in the position of the switches at the corresponding point.

5. In a system of control, the combination with a plurality of dynamo-electric machines, of a plurality of switches for closing a predetermined sequence to effect operation of said machines, a master switching device for governing said switches, and a plurality of actuating coils for said switches, of a limit switch for normally closing the switches in said sequence in accordance with current conditions, and means dependent upon a material difference of machine speeds for rendering said limit switch inoperative and for preventing any change in the position of the switches at the corresponding point.

6. In a system of control, the combination with a plurality of dynamo-electric machines, a plurality of switches for closing in a predetermined sequence to effect operation of said machines, a master switching device for governing said switches, and a plurality of actuating coils for said switches, of a limit switch for normally effecting the energization of said actuating coils in said sequence in accordance with current conditions, and differential relay means for halting the sequence whenever material differences of machine speed obtain, said relay means being provided with coils that are energized in accordance with the respective machine currents.

7. In a system of regenerative control, the combination with a plurality of momentum-driven dynamo-electric machines, of means comprising a plurality of switches for normally and progressively effecting retardation of said machines, and means dependent upon a material difference of machine speeds for automatically modifying the normal retarding operation while maintaining the position of said switches unchanged.

8. In a system of regenerative control, the combination with a plurality of momentum-driven dynamo-electric machines, of means for normally and automatically retarding said machines in accordance with current conditions, and means dependent upon a material difference in the machines' speeds for automatically halting the retardation until normal speed conditions again obtain.

9. In a system of regenerative control, the combination with a plurality of momentum-driven dynamo-electric machines, of a plurality of switches for closing in a predetermined sequence to effect retardation of said machines, and means dependent upon a material difference of machine speeds for halting said sequence at the corresponding point.

10. In a system of regenerative control, the combination with a plurality of momentum-driven dynamo-electric machines, a plurality of switches for closing in a predetermined sequence to regulate the regenerative operation of said machines, a master switching device for governing said switches, and a plurality of actuating coils for said switches, of a limit switch for normally closing the switches in said sequence in accordance with regenerated-current conditions, and relay means dependent upon a material difference of machine speeds for rendering said limit switch inoperative with respect to continuing said sequence from the corresponding point.

11. In a system of control, the combination with a plurality of dynamo-electric machines severally having armatures and field windings, of an auxiliary source of energy for exciting said field windings, means for varying such excitation under predetermined conditions, and means dependent upon material differences of machine speeds for halting such variation.

12. In a system of control, the combination with a plurality of dynamo-electric machines severally having armatures and field windings, of a plurality of resistors in series-circuit relation with the respective armatures, a plurality of switches for short-circuiting different sections of said resistors, a limit switch for governing the operation of said switches, and relay means dependent upon material differences of machine speeds for preventing any change in the position of said switches.

13. In a system of control, the combination with a plurality of dynamo-electric machines severally having armatures and field windings, of a plurality of resistors in series-circuit relation with the respective armatures, an auxiliary source of energy for exciting said field windings through the respective resistors, a plurality of switches for varying the active circuit value of the resistors, a limit switch for governing the operation of said switches, and relay means dependent upon material differences of machine speeds for halting the variation of said resistors.

14. In a system of control, the combination with a plurality of dynamo-electric machines, of a plurality of governing switches therefor, and two relay devices for controlling said switches under predetermined conditions, one of said relay devices being provided with an actuating coil that is connected in series-relation with the machines and the other relay device being provided with differentially-acting coils that are severally connected in series relation with the two machines.

15. In a control system, the combination with a plurality of dynamo-electric machines, of means for normally effecting operation of said machines, means dependent upon a material difference of machine speeds for halting said operation, and means dependent upon predetermined abnormal speed conditions of a plurality of machines for also halting said operation.

16. In a control system, the combination with a plurality of dynamo-electric machines, of means for normally and progressively effecting operation of said machines in accordance with current conditions, relay means dependent upon a material difference of machine speeds for halting said operation, and relay means dependent upon predetermined skidding conditions of a plurality of machines for also halting said operation.

17. In a control system, the combination with a plurality of dynamo-electric machines, of means for normally and progressively effecting operation of said machines in accordance with current conditions, relay means for partially governing said operation and having opposing coils energized in accordance with the respective machine currents, and other relay means for partially governing said operation and having an actuating coil energized by the combined machine currents.

18. In a system of regenerative control, the combination with a plurality of momentum-driven dynamo-electric machines severally having armatures and field windings, of an auxiliary source of energy for exciting said field windings, means for normally varying such excitation, relay means dependent upon a material difference of machine speeds for halting such variation, and other relay means dependent upon predetermined slippage conditions of a plurality of machines for also halting such variation.

19. In a system of regenerative control, the combination with a plurality of momentum-driven dynamo-electric machines severally having armatures and field windings, of an auxiliary source of energy for exciting said field windings, means for normally varying such excitation, relay means for partially governing such variation and having opposing coils energized by the respective armature currents, and other relay means for permitting such variation when in its upper position and having an actuating coil energized by the combined armature currents.

20. In an electrically-braked vehicle, the combination with a plurality of momentum-driven dynamo-electric machines, of means dependent upon a material difference of machine speeds for automatically sanding the rails while maintaining operative main-machine conditions.

21. In an electrically-braked vehicle, the combination with a plurality of momentum-driven dynamo-electric machines, of a rail-sanding apparatus, and means dependent upon a material difference in the currents generated by said machines for automatically actuating said apparatus to sand the rails while maintaining operative main-machine conditions.

22. In an electrically-braked vehicle, the combination with a plurality of momentum-driven dynamo-electric machines, of a rail-sanding apparatus, and relay means differentially energized in accordance with the respective machine currents for automatically actuating said apparatus to sand the rails while effecting modified operative main-machine conditions.

23. In an electrically-braked vehicle, the combination with a plurality of momentum-driven dynamo-electric machines, of a rail-sanding apparatus, an actuating coil for said apparatus, and relay means differentially energized in accordance with the respective machine currents for automatically energizing said actuating coil under predetermined machine-skidding conditions while maintaining operative machine connections.

24. In an electrical vehicle, the combination with a plurality of dynamo-electric machines, of a rail-sanding apparatus, and a relay device having opposing coils energized in accordance with the respective machine currents for automatically actuating said apparatus under predetermined conditions while maintaining operative machine connections.

25. In an electrical vehicle, the combination with a plurality of dynamo-electric machines, of a rail-sanding apparatus, an actuating coil therefor, and a relay device having opposing coils energized in accordance with the respective machine currents for automatically energizing said coil under predetermined machine-skidding conditions while effecting modified operative machine connections.

26. In a system of regenerative control, the combination with a plurality of momentum-driven dynamo-electric machines, of means for normally and progressively effecting retardation of said machines, and means dependent upon a material difference of machine speeds for automatically limiting the torque of said machines.

27. In a system of control, the combination with a plurality of momentum-driven dynamo-electric machines, of means for normally and progressively effecting retardation of said machines, and means dependent upon skidding conditions in one machine for automatically counteracting undesirable increases of torque in the other machine.

28. In a system of control, the combination with a plurality of dynamo-electric machines, of means for normally and progressively effecting operation of said machines, and means dependent upon a material difference of the currents traversing certain portions of the respective machines for automatically modifying said operation.

29. In a system of regenerative control, the combination with a plurality of momentum-driven dynamo-electric machines, of means for normally and progressively effecting retardation of said machines, and means dependent upon a material difference of the currents traversing certain windings of the respective machines for automatically modifying the normal retarding operation.

In testimony whereof I have hereunto subscribed my name this 22nd day of Sept., 1916.

RUDOLF E. HELLMUND.